United States Patent [19]

Burton

[11] 4,092,514

[45] May 30, 1978

[54] METHOD FOR WELDING THROUGH PAINT

[75] Inventor: Ralph M. Burton, Grosse Pointe, Mich.

[73] Assignee: USM Corporation, Boston, Mass.

[21] Appl. No.: 614,367

[22] Filed: Sep. 18, 1975

[51] Int. Cl.$^2$ ............................................. B23K 11/00
[52] U.S. Cl. ..................................... 219/99; 156/155; 156/247; 219/92; 219/98; 427/273
[58] Field of Search ........................ 219/92, 93, 98, 99; 427/273; 228/206, 205; 156/247, 155, 344

[56] References Cited

U.S. PATENT DOCUMENTS

| | | | |
|---|---|---|---|
| 2,563,417 | 8/1951 | Pessel | 427/273 |
| 3,037,886 | 6/1962 | Ryznar | 427/273 |
| 3,181,235 | 5/1965 | Wallis | 219/92 |
| 3,233,073 | 2/1966 | Ruetschi | 219/93 |
| 3,277,268 | 10/1966 | Williams | 219/92 |
| 3,335,088 | 8/1967 | Mandell | 156/344 |
| 3,663,326 | 5/1972 | Wanesky | 156/155 |
| 3,869,813 | 7/1976 | Minetti | 156/344 |

*Primary Examiner*—Elliot A. Goldberg
*Attorney, Agent, or Firm*—Burton, Parker & Schramm

[57] ABSTRACT

Relates to a method of and apparatus for electric welding through insulation coatings, such as paint, on metallic surfaces by directing a vapor jet of paint solvent upon a selected area of a painted metal surface to first soften and then vaporblast the softened paint away from the area to expose a bare spot of the metal surface for welding. Then, before the softened paint reflows back over the bare spot as a result of the discontinuance of the vapor jet, quickly bringing a metal part into welding range of the bare spot and welding the two metal parts together. Following the welding operation, the softened paint coating reflows over the exposed welded juncture and hardens to form a protective film thereover.

8 Claims, 10 Drawing Figures

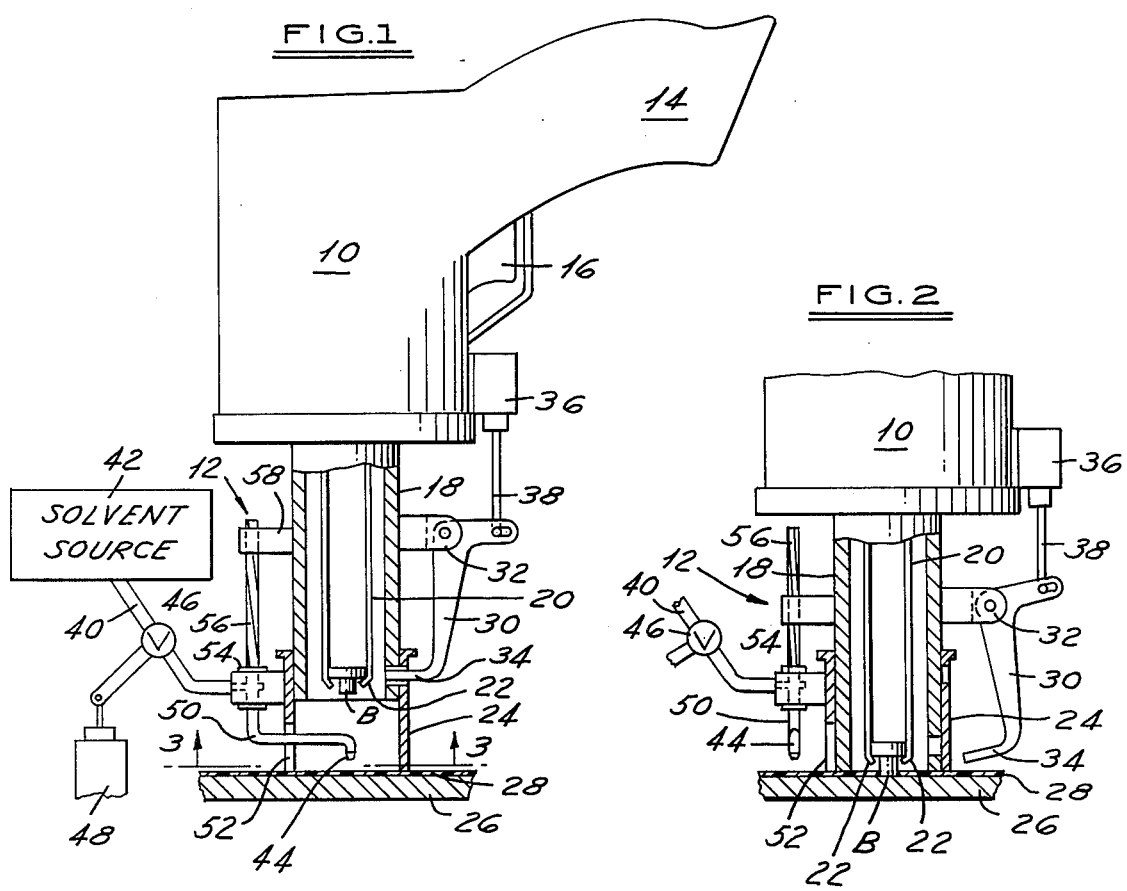
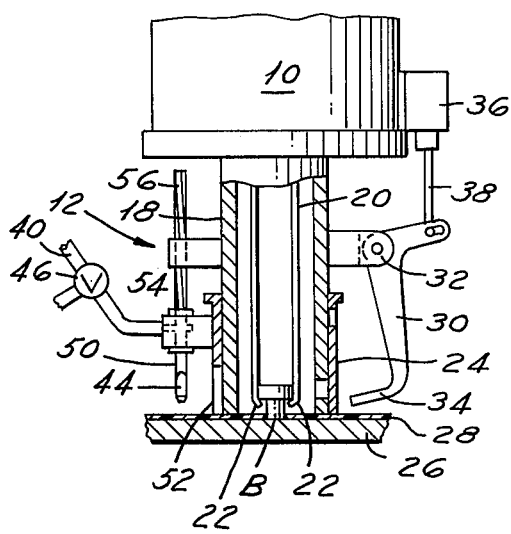
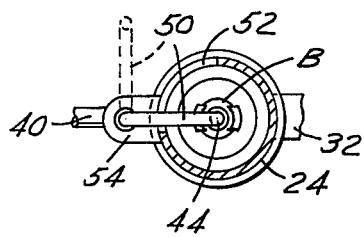
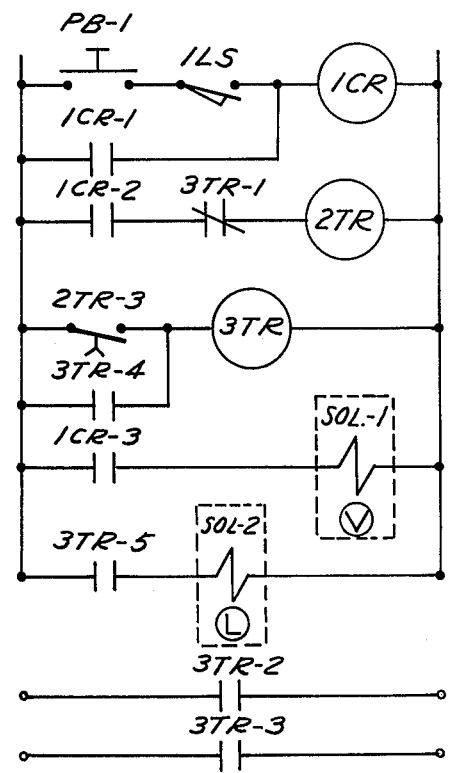
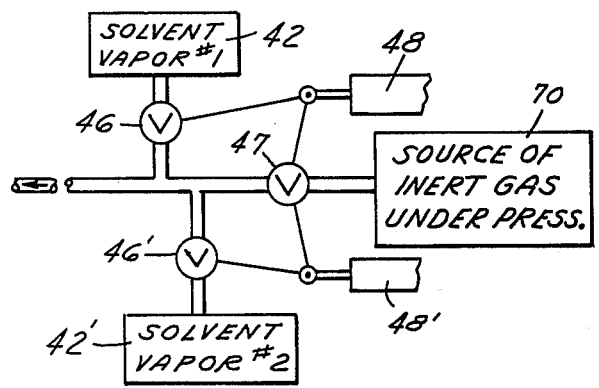

METHOD FOR WELDING THROUGH PAINT

BACKGROUND OF THE INVENTION

This invention relates to electric welding of parts together and more particularly to a method of and apparatus for removing an insulating surface layer or coating on one of the parts to effect metal-to-metal contact.

Various efforts have been made in the past to electrically weld metallic parts together through painted or insulation-coated surfaces, and exemplary of such are the techniques disclosed in the patents, to Ruetschi, U.S. Pat. No. 3,233,073 and Sweeney, U.S. Pat. No. 3,340,379. These patented methods required a mechanical disturbance of the coated surface, such as by puncturing or scraping the coating, to physically remove an intervening portion of the coating for establishing the metal-to-metal contact between the parts to be welded. Moreover, at the conclusion of the welding operation it was usually necessary to repaint or recoat the weld line to protect the welded connection against corrosion.

SUMMARY OF THE INVENTION

An important object of the invention is to provide an improved method of and apparatus for electric welding through insulative layers, such as paint, on metallic surfaces to be welded together.

Another important object of the invention is to provide an improved method of and apparatus for electric welding through insulation layers, such as paint coatings on metal surfaces, which achieves the desired localized exposure of the underlying metal surface without entailing solid object penetration of the insulative layer.

A further important object of the invention is to provide an improved method of and apparatus for electric welding through insulative surface layers on metallic parts which is performed rapidly and economically and results in a corrosive resistant coating around the weld line exhibiting a "finished" appearance.

In carrying out the above objects, the invention contemplates the application of a fast acting chemical medium to soften and loosen a given area of a hardened insulative surface layer or coating on a metallic part and upon continued application of such medium to dislodge the softened coating sufficiently to expose a bare spot on the metallic part for performing a welding operation. More specifically, the chemical medium may take the form of a vaporized solvent capable of softening the material of the insulative layer or coating on a metallic part. This chemical agent is applied in the form of a vapor jet stream directed at a selected localized area of the layer to first soften and then to blow or blast the softened and flowable coating material sufficiently away from the selected area to expose a bare spot of the surface of the metallic part. The securement by welding or otherwise of a second metallic part to the bare spot of the first part is performed before the softened dislodged coating material reflows back over the bare spot. Reflow of the coating material can be initiated by reducing or cutting off the chemical jet stream, and when complete reflow occurs following the connecting operation it will cover the peripheral weld line effectively and form a dry hardened coating preventing corrosion while at the same time exhibiting a "finished" appearance.

Equipment embodying the invention may be based on the stud welding apparatus of the drawn-arc or percussive types, such as respectively disclosed in the Ettinger and Meyer U.S. Pat. No. 3,546,420 and the Ettinger and Zorka U.S. Pat. No. 3,854,027, both of common ownership herewith.

An important feature of the invention which is added to such basic apparatus is a vapor jet tube connectible to a source of a solvent capable of dissolving the material of the insulating layer or paint covering the metallic surface to be welded. The discharge end or nozzle of the tube is positionable directly opposite to and slightly spaced from the area of the coated or painted surface where the welding action is to take place. For performing its function, the solvent is discharged from the nozzle onto the coated area in a vaporized jet stream having the desired concentration to soften but not to dissolve appreciatively the coated or painted area upon which it impinges and having sufficient pressure to blow the softened and now mobile coating aside to bare the underlying metal surface. The welding apparatus further include means for sequencing the jet stream action and the welding action and for timing the termination of the jet stream action and the commencement of the welding action to take advantage of the reflow of the mobile coating to form a protective layer over the weld line. The apparatus is so designed as to guide a stud or button immediately to the jet blown bare metal spot and be subjected to a welding current before the mobile coating material has reflowed over any significant portion of the bared area.

BRIEF DESCRIPTION OF THE DRAWINGS

Various other objects, advantages and meritorious features of the invention will become more fully apparent from the following specifications, appended claims and accompanying drawing figures wherein:

FIG. 1 a side elevation of a welding apparatus embodying the invention and partially broken away in section to reveal the interior mechanism and showing the same in initial position for directing a vaporized solvent jet stream upon an insulatively coated metal surface;

FIG. 2 is a view generally similar to FIG. 1 but showing the operating parts of the apparatus in position for welding a stud to a jet-blown bared spot on the coated metal surface following discontinuance of the jet stream action;

FIG. 3 is a cross-sectional view of the welding apparatus taken along line 3—3 of FIG. 1 and showing in full and dotted lines the operating and non-operating positions respectively of the solvent vapor discharge tube;

FIG. 5 is a simplified electrical schematic diagram of a suitable control circuit for timing the sequential operation of the welding apparatus shown in FIGS. 1–3;

FIG. 6 illustrates a modified form of delivery of a vaporized solvent and an inert gas under pressure.

DESCRIPTION OF A PREFERRED EMBODIMENT

Figure 4A:
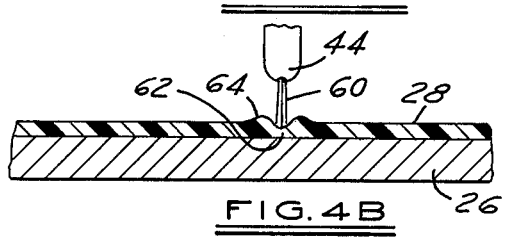
FIGS. 4A to 4E illustrate a series of successive steps in the process of utilizing a vapor jet stream of solvent material for first softening a local area of a paint coated substrate surface and then exposing a bare spot of such surface, following which a metal stud or other article is affixed as by welding to the bared surface before reflow of the softened paint coating completely covers the bare spot.

FIGS. 1–3 illustrate a welding apparatus embodying the invention which is herein shown in the general shape of the commonly known pistol configuration having a main body or housing portion 10 terminating at one end in a reduced extension 12 composed of parts for performing a welding operation and at the other end in a lateral projection serving as a handle 14. At the junction of the handle to the body there is provided a finger operable triggering member 16 which in this instance serves to close an electric switch for initiating the welding operation. Obviously, the overall shape of the apparatus may take other forms, and as it will become more evident hereinafter the invention may be accommodated in different types of welding equipment, such as drawn-arc and percussive welding types.

The reduced extension 12 comprises a tubular body 18 fixed to the adjacent end of the housing 10 and serving as an arc shield. Supported centrally within the tubular body 18 is a delivery conduit or guide 20 through which studs or button type elements are sequentially fed for individual welding purposes. The lower or downstream end of the delivery conduit 20 is longitudinally slitted or otherwise shaped to form a plurality of inturned collet fingers 22 which function as a collet for releasably holding each delivered stud or button B in the manner shown in FIGS. 1 and 2 with the leading end of the button in substantially flush relation to the lower end of the tubular body 18.

Telescopingly received over the lower unsupported end of the tubular body 18 is a sleeve 24 serving as a spacer shield in one position of its slidable movement relative to the tubular body. Referring to FIG. 1, the spacer shield 24 is shown locked in position as an extension of the tubular body 18 and abutting a metal substrate or object 26, such as an automobile panel, having a thin insulative coating 28, such as an acrylic paint customarily used to cover and decorate metal panels in the automobile industry. In the position of the parts in FIG. 1, the collet 22 and a stud or button B retained thereby is spaced from the coated surface 26 by the locked spacer sleeve 24. dr The herein disclosed provision for releasably locking the spacer shield or sleeve 24 in extended condition takes the form of a crank arm 30 pivoted on ear 32 attached to the arc shield 18 and having an inturned end 34 which in FIG. 1 is received in aligned holes in the overlapping portions of the spacer sleeve and the arc shield thus holding the spacer sleeve against movement relative to the arc shield. The crank arm is capable of swinging movement about its pivoted axis to withdraw its inturned end 34 from the aligned holes. When so swung, the spacer sleeve 24 is free to slide on the arc shield and to be collapsed to the position shown in FIG. 2 where the lower end of the spacer sleeve coincides with the lower end of the arc shield. In this last position as illustrated in FIG. 2, the button B carried by the collet 22 is brought up against the surface to which it is to be welded. The crank arm 30 is activated by a solenoid 36 secured to the housing 10 and having an extension 38 on its armature which is loosely attached to the shorter arm of the crank arm. Energization of the solenoid will rock the crank arm in a counter clockwise direction to withdraw its inturned end 34 and unlock the spacer sleeve from the arc shield.

The herein disclosed provision for directing a vapor jet of material capable of softening and loosening the hardened insulating coating on the metallic surface takes the form of a tube 40 connected to a source 42 of such material, which tube has its discharge nozzle 44 arranged to direct a pressurized vapor jet of such softening material onto a local area of the coated metallic surface. A desirable material for softening and loosening the coating is a solvent therefor which is applied in heated condition and along with air or an inert gas under pressure as more fully described hereinafter. As shown in FIG. 1, the nozzle 44 is disposed within the area defined by the extended spacer sleeve 24 and the lower end of the tubular arc shield 18 and directed downwardly toward a small portion of the insulative layer or coating 28 covering the metallic substrate 26. In this position the jet stream issuing from the nozzle 44 is directed with considerable force onto the coating 28 and with a cross sectional area considerably less than the base of the article B to be welded to the metallic body 26 as evidenced by the relative sizes of the tip of the nozzle and the base end of the stud illustrated herein. To provide the pressure to develop the jet stream, the source of the jet material may be a drum, as illustrated at 42, containing the solvent composition at the desired concentration and forced to exit from the drum by means of air or inert gas under pressure also contained within the drum or derived from another source and mixed therewith en route to the discharge nozzle. The passage of such fluid in tube is controlled by a valve 46 which in turn is controlled by a solenoid 48 as more fully explained hereinafter.

As is evident in FIG. 1, the discharge nozzle 44 is directly in line with the axis of the arc shield 18 and therefore blocking complete downward movement of the stud or button B for performing the welding operation. To provide clear movement of the stud, the nozzle 44 and its adjacent tube section 50 are movable out of way of the path of movement of the stud. This is accomplished by making the tube section 50 relatively movable with respect to the tube 40 and providing a swinging motion which may be as much as 90° as exhibited by the full and dotted line positions of the tube section 50 in FIG. 3. To permit such swinging movement beyond the confines of the spacer sleeve 24, the latter is provided with an arcurate slot 52 along its lower edge which extends for about one quarter of the circumference of the sleeve as illustrated best in FIG. 3. The swingable movement of the tube section 50 relative to tube 40 may be accomplished either by a flexible tubular connection therebetween or by a rotary valving connection at the juncture of the two tube sections which is dependent on the direction of the swinging movement of tube section 50 to open or close the valve in the connection. In the latter case, the tube juncture is contained within a liquid tight housing 54 which is secured to the spacer sleeve 24 for joint vertical movement therewith.

Forming an upward extension of the inlet end of the tube section 50 and aligning with the axis about which the nozzle end is swingable is an external helically splined shaft 56 extending through a bore in a lateral projection 58 fixed to the arc shield 18. The bore is internally helically splined with the pitch of the splined shaft 56 and interengages the same so that upon downward movement of the projection 58 the shaft 56 is caused to be rotated in such a direction as to swing the tube section 50 out of the slot 52 of the spacer sleeve; and it is apparent that upon upward movement of the projection the reverse swinging motion of the tube section 50 takes place. It is also evident that when the arc shield 18 moves downwardly relative to the space sleeve 24 its motion causes the swinging action of the nozzle end of the tube 50 out of the spacer sleeve leaving clear the path of movement of the stud or button B for contact with the bare metallic spot formed by the jet stream material. Either the valving action performed in the housing 54 between the fixed tube 40 and its swingable nozzle section 50 is sufficient for cutting off the jet stream, or in lieu thereof or in addition thereto, the previously mentioned valve 46 and its solenoid control 48 may be employed for this purpose.

Suitable compositions for softening and loosening paint coatings and the like applied to metallic surfaces in accordance with this invention may include fast penetrating solvents of the kind employed in the automobile industry, such as for example, for reflowing acrylic paints and lacquers in the repair of automobile panels. Compositions of several reflow solvent agents suitable for this purpose are disclosed in the Vivian, U.S. Pat. No. 3,663,255. Such fast penetrating solvents will soften and render mobile the hardened acrylic coatings and the like on metallic substrates in the matter of seconds.

In general, suitable solvents for the paint which may be employed are chlorinated hydrocarbons of from 1 to 4 carbon atoms, such as methylene chloride, dichloroethylene, perchloroethylene, trichloroethylene, chloroform and the like; lower aliphatic alcohols of from 1 to 6 carbon atoms, such as methanol, ethanol, propanol, butanol and the like; lower aliphatic ketones of from 3 to 10 carbon atoms, such as acetone, methyl ethyl ketone, methyl isobutyl betone and the like; paraffinic hydrocarbons of from 1 to 6 carbon atoms, such as methane, butane, pentane and the like; aromatic hydrocarbons, such as toluene, benzene, xylene and the like; or other suitable paint solvents, such as Cellosolve (trademark of Union Carbide Corporation for ethylene glycol monoethyl ether), Cellosolve acetate, methyl Cellosolve, butyl Cellosolve and the like.

My invention incorporates such a solvent in a vapor pressure jet stream which is directed at a local area of a paint covered substrate, and the jet stream provides the advantage of not only softening the paint coating and rendering it mobile but of progressively blowing or blasting the mobile coating in widening circles away from the center of the jet stream thereby uncovering a widening spot of bare metal substrate for the welding operation. The widening annular ridge of coating material produced by the jet stream resists such dislodgement and tends to reflow back over the bare spot and immediately proceeds to do so upon cut-off of the jet stream. However, before such reflow succeeds in completely covering the bare spot the affixing or welding operation is performed with the result that the returning paint flows to the peripheral weld line and protectively covers the same.

Figure 4B:
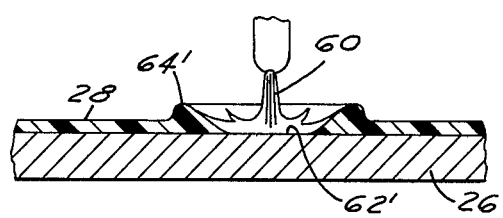

As earlier mentioned herein, FIGS. 4A to 4E illustrate a series of successive steps in practicing the invention. FIG. 4A shows a very small diameter nozzle, such as previously identified by reference character 44, spaced approximately ⅛ inch from a substrate surface 26 over which a coating of paint or other similar dissolvable material 28 lies. Illustrated in FIG. 4A is a vapor pressure jet stream 60 of solvent material which issues from the nozzle at a high linear velocity and preferably at an elevated temperature. This vapor stream impinges upon the paint coat 28, which is shown greatly exaggerated in thickness, and forms a small initial cavity 62 therein around which a small diameter ridge 64 of blasted paint material is created. Further continued operation of the solvent jet stream 60 is illustrated in FIG. 4B where the cavity 62′ has now deepened to expose the bare surface of the metal substrate and has also widened to form a higher and thicker ridge 64′ of softened flowable coating material. When the exposed surface of the substrate 26 is wider than the surface of the object to be attached or welded thereto, the next step in the operation is ready to proceed.

Figure 4C:
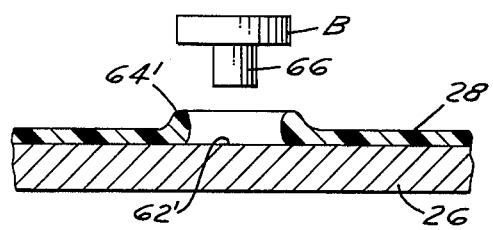
Figure 4D:
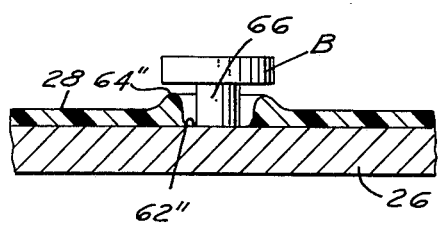
Figure 4E:
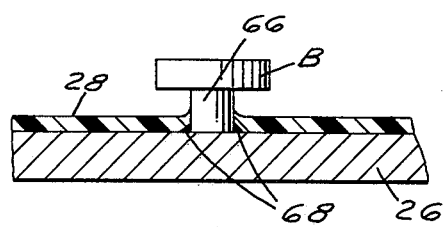

The vapor jet stream 60 is now cut off as by a valve such as indicated at 46 and if need be by the accompanied movement of the nozzle away from the vapor blasted site in order to allow a stud or button B to make contact with the bared surface of the substrate. FIG. 4C shows a stud or button B being lowered into the cavity formed by the jet stream and so that its shank 66 may make direct contact with the exposed surface of the substrate 26. FIG. 4D shows initial contact of the stud's shank directly with the substrate's surface. At about this instant of time the control circuit of the apparatus perform its function of welding the shank of the stud to the substrate metal. The return flow of the softened coating material 64″, however, has reduced the width of the cavity as shown at 62″. In FIG. 4E the reflow of coating material is shown completed and closely hugging the stud's shank 66 and covering the peripheral weld line 68.

In FIG. 5 there is shown a simplified schematic diagram of an electrical circuit for controlling the operation of the welding apparatus shown in FIGS. 1-3 inclusive. The actual welding circuit for effecting current supply to the stud or button B to be welded onto the panel 26 is partially shown in the bottom portion of FIG. 5. The upper remaining portion of FIG. 5 is directed to the control circuit of sequencing the operation of the vaporized solvent jet stream and the subsequent electrical welding of the stud or button B to the exposed underlying metal surface of a coated metal panel or the like, such as shown at 26 in FIGS. 1, 2 and 4A to 4E.

In the initial starting condition of the apparatus, the valve V of the circuit diagram which is otherwise identified as valve 46 in FIGS. 1 and 2 is normally biased to closed position preventing discharge of solvent vapor. In such condition the apparatus is brought up adjacent to the painted panel 26 with the nozzle 44 in close but spaced relation to the panel and directed theretoward and with the spacer shield 24 in contact with the panel in the manner illustrated in FIG. 1. The circuit of FIG. 5 shows a manually operable switch PB-1 representative of the trigger 16 which may be provided in circuit series relation with a limit switch 1LS, the latter being movable to closed condition when the welding device assumes its starting position in FIG. 1 and the spacer sleeve 24 abuts the coated panel. Assuming that a stud or button B has been fed to the welding device and is held by the collet 20-22, the actuation of the trigger switch PB-1 and limit switch 1LS to closed positions will initiate the operation of the control circuitry by energizing control relay 1CR, closing its associated relay contacts 1CR-1 to lock the relay in and at the same time closing its contacts 1CR-2 to actuate the time delay relay 2TR which is operatively associated with the solenoid SOL. 1 (otherwise identified as the valve solenoid 48 in FIGS. 1 and 2) for energizing the same. When energized the solenoid opens valve V initiating the flow of the solvent composition from source 42 and the discharge of the solvent jet stream from the nozzle 44 unto the adjacent area of the coated panel. When the relay 2TR times out, time delay contacts 2TR-3 are closed thereby energizing time delay relay 3TR.

Energization of relay 3TR opens normally closed contacts 3TR-1 to de-energize relay 2TR and thereby to de-energize the solenoid SOL. 1 causing valve V to close and interrupt the flow of the solvent jet stream. Thus, until the instant of closing the valve V, the adjacent area of the coated panel has been subjected to the softening effect of the solvent. Moreover, the area has been subjected to the blasting effect of the solvent jet stream which dislodges the now mobile coating away from the center of its impingement with the result that the underlying metal surface is exposed but surrounded by a built up ridge of flowable coating material. The energization of time delay relay 3TR also simultaneously closes its associated relay contacts 3TR-2 and 3TR-3 in the welding circuit to prepare this circuit for the welding operation when the button B makes contact with the exposed metal surface of the panel 26.

Energization of delay relay 3TR also simultaneously closes relay contacts 3TR-4 to lock in relay 3TR and also closes relay contacts 3TR-5 to energize solenoid SOL. 2 (otherwise identified as the sleeve unlocking solenoid 36 in FIGS. 1 and 2) with which relay 3TR is operatively associated. The energization of solenoid SOL. 2 serves to retract the sleeve locking element 30 thereby releasing the telescoping members 18 and 24 for relative contractible movement bringing the button B downwardly into contact with the exposed bare spot on the panel 26 and initiating the welding cycle as above described. The delay period of the relay 3TR is timed to last until a satisfactory weld between the button and panel is completed and while the accumulated surrounding ridge of insulative coating material is still flowable. When the relay 3TR times out, the collet 20-22 and associated jointly movable parts are retracted away from the panel thereby disengaging the collet from the now welded button. This retraction operation together with the feed or another stud or button to the collet for the next welding operation may employ conventional control circuits and components such as disclosed in the referenced U.S. Pat. Nos. 3,546,420 and 3,854,027. For this reason such circuit control features are omitted from the diagram of FIG. 5.

If the substrate has a primer coating over which a finish exterior coating is applied, the primer coating may be removed by selecting a suitable solvent capable of dissolving both the finish and primer coatings, or if separate solvents are necessary by sequentially subjecting the finish and primary coatings to their respective solvent materials. FIG. 6 schematically illustrates such a valving system where two different vaporized solvent materials are delivered sequentially to the surface area of a coated substrate to be treated. One vapor solvent source is identified at 42 in FIG. 6 and corresponds to the solvent source illustrated at 42 in FIG. 1. One solenoid 48 is provided with suitable linkages for simultaneously controlling the opening and closing of the valve 46 associated with solvent source 42 and a second valve 47 in the outlet of a source of inert gas under pressure indicated at 70. When delivered to the area of the substrate to be treated, the solvent vapor provided by source 42 will soften and render mobile the finish coating on the substrate as earlier described herein.

A second similar control system is provided in FIG. 6 for the second solvent vapor comprising a sorce of such solvent vapor 42' and its associated valve 46', a solenoid 48', and valve 47. As in the case of the first described control system, the second system will simultaneously open and close the valves 46' and 47 to deliver the desired mixture of vapors from the second solvent source to the nozzle 44. The circuit of FIG. 5 could be modified by the addition of a circuit for solenoid 48' and a time delay relay therefor which would initiate delivery of the second vapor solvent under pressure of the inert gas after cut-off of the delivery of the first solvent material and maintain the flow of solvent vapor for a predetermined length of time. If the underlying primer coating should be especially resistive to solvent materials, the selected solvent could be ejected at an elevated temperature and at a high linear velocity through a very small diameter orifice in the nozzle by the pressure of the inert gas. When the article to be attached is to be welded to the substrate, only a very small area of the primer coating need be softened and dislodged. The welding action will increase this area once it is initiated. Moreover, in the case of percussive stud welding, it would be helpful to provide a pointed extremity on the advancing end of the stud for engagement with the substrate as described in the referenced patent to Ettinger and Zorka U.S. Pat. No. 3,854,027.

While particular embodiments of the invention have been described and illustrated, it will be understood, of course, that it is not desired that the invention be limited thereto since additional modifications may be made. It is, therefore, contemplated by the appended claims to cover any such modifications as fall within the true spirit and scope of the invention.

What is claimed is:

1. The method of electric welding a metal part to an electrically insulatively coated metallic surface which comprises:
   1. directing a vapor jet of a solvent for the insulative coating into contact with a local area of the coating on the metallic surface and for a time period sufficient to soften and render flowable the coating in said area,
   2. continuing the application of said vapor jet to said local area to dislodge the softened flowable coating at least to one side of said local area in order to expose an uncoated bare spot of the metallic surface.
   3. discontinuing the application of said vapor jet to said local area, and
   4. electric welding the metal part to a portion of the exposed bare spot of the metallic surface before the softened coating reflows back over the remainder of the bare spot to the weld line and then following the electric welding of the metal part to the exposed bare spot of the metallic surface allowing the softened coating to reflow to the weld line to form a protective coating thereover.

2. The method of securing an object to the surface of a substrate bearing a hardened difficultly removable coating which comprises:
   1. directing a vapor jet of a material capable of softening such coating into contact with the local area of the substrate's surface to which the object is to be secured and for a time period sufficient to soften the hardened coating in said area and render flowable the coating in said area;
   2. continuing the application of said vapor jet to said local area to dislodge the softened flowable coating at least to one side of said local area in order to expose an uncoated bare spot of the substrate's surface;
   3. discontinuing the application of said vapor jet to said local area; and
   4. affixing the object to a portion of the exposed bare spot of the substrate's surface before the softened coating reflows back over the remainder of the bare spot to the line of securement of the object to the substrate's surface and while the coating is still reflowable, and then following the fixation of the object to the exposed bare spot of the substrate's surface allowing the coating to reflow back over the exposed bare spot to form a coating thereover.

3. The method defined in claim 2 characterized in that the vapor jet has a cross-sectional area less than the cross-sectional area of that portion of the object to be secured to the substrate.

4. The method of electrically welding a metal part to a paint coated metal panel which comprises:
 1. directing a vapor jet of paint reflow solvent into contact with the area of the metal panel to which the metal part is to be secured and for a time period sufficient to soften the paint coating in said area and to vapor-blast the softened paint aside to expose an uncoated bare spot of the metal panel,
 2. electrically welding the metal part to the exposed bare spot of the metal panel while the softened paint coating is reflowable, and
 3. following the electric welding of the metal part, the paint coating is allowed to reflow back over the exposed bare spot.

5. The invention defined by claim 4 wherein the paint is reflowed back over the bare spot to and covers the weld joint.

6. The method of securing an object to the surface of a substrate bearing a hardened difficultly removable coating which comprises:
 1. directing a vapor jet of a material capable of softening such coating toward the substrate's surface for contact with the local area thereof to which the object is to be secured and for a time period sufficient to soften the hardened coating in said area and render flowable the coating in said area;
 2. continuing the application of said vapor jet to said local area to vapor-blast the softened flowable coating aside thereby to expose an uncoated bare spot of the substrate's surface;
 3. discontinuing the application of said vapor jet; and
 4. affixing the object to the exposed bare spot of the substrate's surface immediately following the discontinuance of said vapor jet and while the coating is still flowable, and then following such fixation allowing the softened coating to reflow over the still exposed portion of the bare spot on the substrate's surface.

7. The method defined in claim 1 characterized in that the vapor jet has a cross-sectional area less than the cross-sectional area of that portion of the metal part to be spot welded to the metallic surface.

8. The method defined in claim 6 characterized in that the discontinuance of the application of said vapor jet occurs once the exposed bare spot attains a size greater than the surface portion of the object to be secured thereto.

* * * * *